(12) United States Patent
Suzuki et al.

(10) Patent No.: US 9,929,686 B2
(45) Date of Patent: Mar. 27, 2018

(54) CONTROLLER FOR PERMANENT MAGNET SYNCHRONOUS MOTOR, IMAGE FORMING APPARATUS, AND CONTROL METHOD

(71) Applicant: Konica Minolta, Inc., Chiyoda-ku, Tokyo (JP)

(72) Inventors: Daichi Suzuki, Toyokawa (JP); Yuta Tachibana, Toyokawa (JP); Hiroyuki Yoshikawa, Toyohashi (JP); Yasuhiro Koide, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/647,597

(22) Filed: Jul. 12, 2017

(65) Prior Publication Data

US 2018/0019693 A1 Jan. 18, 2018

(30) Foreign Application Priority Data

Jul. 12, 2016 (JP) .................. 2016-137876

(51) Int. Cl.
*G05D 23/00* (2006.01)
*H02P 21/26* (2016.01)
(Continued)

(52) U.S. Cl.
CPC ............... *H02P 21/26* (2016.02); *G01K 7/16* (2013.01); *H02K 1/2753* (2013.01); *H02K 17/14* (2013.01); *H02K 19/12* (2013.01); *H02K 19/32* (2013.01); *H02P 6/17* (2016.02); *H02P 21/141* (2013.01); *H02P 21/18* (2016.02); *H02K 1/2786* (2013.01)

(58) Field of Classification Search
CPC ...... H02P 1/00; H02P 3/00; H02P 5/00; H02P 6/00; H02P 7/00; H02P 21/00; H02P 23/00; H02P 25/00; H02P 27/00; H02P 1/04; H02P 27/04; H02K 29/06; G05B 5/00; G05D 23/00; H02H 7/08
USPC .... 318/400.01, 400.02, 400.14, 400.15, 599, 318/800, 801, 805, 809, 811, 471, 472; 388/800, 819; 363/21.1, 40, 95
See application file for complete search history.

(56) References Cited

U.S. PATENT DOCUMENTS

| | | | |
|---|---|---|---|
| 8,242,722 B2 * | 8/2012 | Matsui | B60L 11/14 318/400.04 |
| 8,912,739 B2 * | 12/2014 | Kobayashi | H02P 29/662 318/400.02 |
| 8,981,694 B2 * | 3/2015 | Yoon | H02P 6/165 318/400.32 |

\* cited by examiner

*Primary Examiner* — Antony M Paul
(74) *Attorney, Agent, or Firm* — Buchanan Ingersoll & Rooney PC

(57) ABSTRACT

A controller for a permanent magnet synchronous motor includes an estimating portion configured to determine an estimated value of a rotational speed of the rotor and an estimated value of a position of magnetic poles of the rotor based on a value of the current detected by the current detector and a parameter value indicating an interlinkage magnetic flux caused by the permanent magnet across the winding; a control unit configured to control the drive portion to cause the rotating magnetic field based on the estimated value of the rotational speed and the estimated value of the position of the magnetic poles; and a correction portion configured to correct the parameter value indicating the interlinkage magnetic flux based on correction information, the correction information being determined based on a temperature of the winding and a relationship between the temperature of the winding and a temperature of the permanent magnet.

14 Claims, 18 Drawing Sheets

(51) Int. Cl.
*H02P 21/14* (2016.01)
*H02P 21/18* (2016.01)
*G01K 7/16* (2006.01)
*H02P 6/17* (2016.01)
*H02K 1/27* (2006.01)
*H02K 17/14* (2006.01)
*H02K 19/12* (2006.01)
*H02K 19/32* (2006.01)

(CASE OF $R \geq R0[1+\alpha 1(Ts-T0)]$)
$\phi = \phi 0 \{ 1+\alpha 2 \{ \beta [(R/R0)-1]/\alpha 1 + T0-Ts \} + Ts-T0 \} \}$ (CASE OF $R < R0[1+\alpha 1(Ts-T0)]$)
$\phi = \phi 0 \{ 1+\alpha 2[(R/R0)-1]/\alpha 1 \} \}$

61 CORRECTION INFORMATION

| TYPE | | SET TEMPERATURE $T_s$ (°C) | WINDING RESISTANCE VALUE R | | | | | | | | | |
|---|---|---|---|---|---|---|---|---|---|---|---|---|
| | | | $R_{01}$ | $R_{02}$ | $R_{03}$ | $R_{04}$ | ... | $R_{0n}$ | | | | |
| A | | 0 | $\phi h_{01}$ | $\phi h_{02}$ | $\phi h_{03}$ | $\phi h_{04}$ | ... | $\phi h_{0n}$ | | | | |
| | | 0.5 | $\phi h_{11}$ | $\phi h_{12}$ | $\phi h_{13}$ | $\phi h_{14}$ | ... | $\phi h_{1n}$ | | | | |
| | | ... | ... | ... | ... | ... | ... | ... | | | | |
| | | 27.5 | $\phi h_{51}$ | $\phi h_{52}$ | $\phi h_{53}$ | $\phi h_{54}$ | ... | $\phi h_{5n}$ | | | | |
| | | ... | ... | ... | ... | ... | ... | ... | | | | |
| | | 55 | $\phi h_{91}$ | $\phi h_{92}$ | $\phi h_{93}$ | $\phi h_{94}$ | ... | $\phi h_{9n}$ | | | | |
| B | | 0 | $\phi h_{01}$ | $\phi h_{02}$ | $\phi h_{03}$ | $\phi h_{04}$ | ... | $\phi h_{0n}$ | | | | |
| | | 0.5 | $\phi h_{11}$ | $\phi h_{12}$ | $\phi h_{13}$ | $\phi h_{14}$ | ... | $\phi h_{1n}$ | | | | |
| | | ... | ... | ... | ... | ... | ... | ... | | | | |
| | | 27.5 | $\phi h_{51}$ | $\phi h_{52}$ | $\phi h_{53}$ | $\phi h_{54}$ | ... | $\phi h_{5n}$ | | | | |
| | | ... | ... | ... | ... | ... | ... | ... | | | | |
| | | 55 | $\phi h_{91}$ | $\phi h_{92}$ | $\phi h_{93}$ | $\phi h_{94}$ | ... | $\phi h_{9n}$ | | | | |

(61a: TYPE A rows; 61b: TYPE B rows)

CONTROLLER FOR PERMANENT MAGNET SYNCHRONOUS MOTOR, IMAGE FORMING APPARATUS, AND CONTROL METHOD

Japanese Patent application No. 2016-137876 filed on Jul. 12, 2016, including description, claims, drawings, and abstract of the entire disclosure is incorporated herein by reference in its entirety.

BACKGROUND

1. Technical Field

The present invention relates to a controller for permanent magnet synchronous motor, an image forming apparatus, and a control method.

2. Description of the Related Art

Permanent Magnet Synchronous Motors (PMSM) generally have a stator with windings and a rotor using a permanent magnet. In such permanent magnet synchronous motors, an alternating current is applied to the windings to cause a rotating magnetic field, which rotates the rotor synchronously therewith.

Recent years have seen the widespread use of sensorless permanent magnet synchronous motors. Such a sensorless permanent magnet synchronous motor has no encoder and no magnetic sensor for detecting a position of magnetic poles. For this reason, in order to control such a sensorless permanent magnet synchronous motor, a method is used in which a position of magnetic poles of a rotor and a rotational speed thereof are estimated by using a predetermined arithmetic expression such as an expression for d-q axis model based on, for example, an induced voltage generated in windings of a stator during rotation. The operation for estimation is related to a plurality of parameters (motor constant).

Meanwhile, in the permanent magnet synchronous motor, the temperature of the winding or of the permanent magnet changes in association with an ambient temperature or a temperature rise caused by drive. This makes a difference between parameter values used for the estimation and the actual parameter values. The difference leads to inaccurate estimation of the position of magnetic poles and the rotational speed. This sometimes lowers the efficiency and loses synchronization.

There has been proposed a technology for reducing the influence of temperature on estimation (U.S. Pat. No. 8,981,694). According to the technology, a winding resistance value and a magnetic flux value of a permanent magnet which are used in operation for the estimation are compensated based on a temperature of a motor.

However, the technology has a drawback that the difference in parameter values arising from the temperature changes cannot be compensated accurately, and another drawback that errors due to the influence of temperature on the operation for estimation cannot be reduced sufficiently.

To be specific, according to the technology, the temperature of the motor is calculated based on the measured winding resistance value, and compensation is made by taking the temperature of the motor thus calculated as the temperature of the winding and permanent magnet. Stated differently, the winding resistance value and the magnetic flux value of the permanent magnet are compensated on the assumption that the temperature of the winding is equal to the temperature of the permanent magnet.

The winding is usually wound around a fixed core. The permanent magnet is provided in a rotor spaced from the fixed core so as to be rotated. The winding and the permanent magnet are therefore considerably different from each other in temperature in light of their structures and operation. The value of an interlinkage magnetic flux usually varies significantly with change in temperature. Therefore, the accuracy of compensation for the interlinkage magnetic flux to cope with the change in temperature has conventionally been low, which makes it difficult to sufficiently reduce errors in estimation of the position of magnetic poles and of the rotational speed.

SUMMARY

The present invention has been achieved in light of such a problem, and therefore, an object of an embodiment of the present invention is to improve the accuracy of correction on an interlinkage magnetic flux to cope with change in temperature and to further reduce errors in estimation of the position of magnetic poles and of the rotational speed.

To achieve at least one of the abovementioned objects, according to an aspect of the present invention, a controller reflecting one aspect of the present invention is a controller for a permanent magnet synchronous motor having a rotor using a permanent magnet, the rotor rotating by a rotating magnetic field caused by a current flowing through a winding, the controller includes a drive portion configured to apply a current to the winding to drive the rotor; a current detector configured to detect the current flowing through the winding; an estimating portion configured to determine an estimated value of a rotational speed of the rotor and an estimated value of a position of magnetic poles of the rotor based on a value of the current detected by the current detector and a parameter value indicating an interlinkage magnetic flux caused by the permanent magnet across the winding; a control unit configured to control the drive portion to cause the rotating magnetic field based on the estimated value of the rotational speed and the estimated value of the position of the magnetic poles; and a correction portion configured to correct the parameter value indicating the interlinkage magnetic flux based on correction information, the correction information being determined based on a temperature of the winding and a relationship between the temperature of the winding and a temperature of the permanent magnet; wherein the estimating portion uses the parameter value corrected by the correction portion to determine the estimated value of the rotational speed and the estimated value of the position of the magnetic poles.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 11 is a diagram showing an example of correction information.

DETAILED DESCRIPTION OF THE EMBODIMENTS

Hereinafter, one or more embodiments of the present invention will be described with reference to the drawings. However, the scope of the invention is not limited to the disclosed embodiments.

Figure 1:
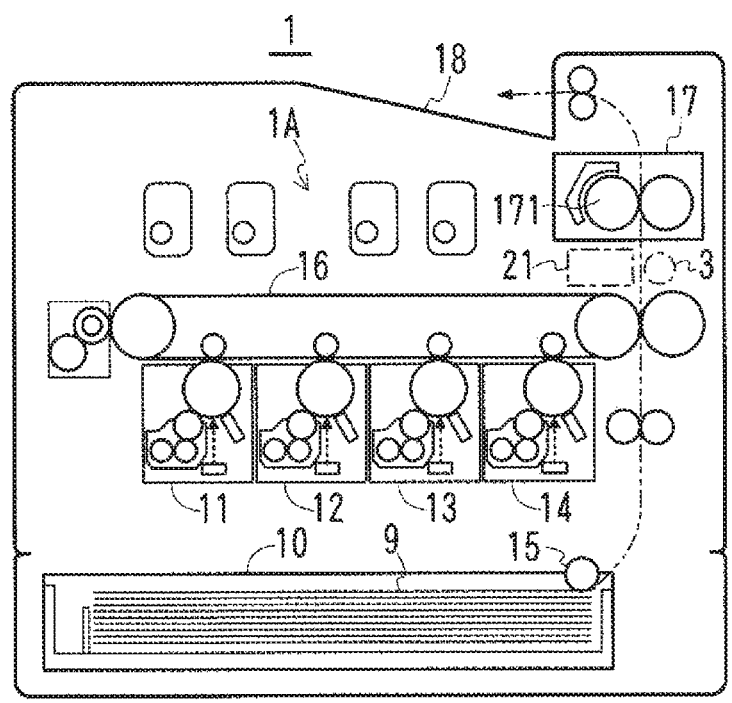
FIG. 1 is a diagram showing an outline of the structure of an image forming apparatus having a motor controller according to an embodiment of the present invention.
Figure 2A:
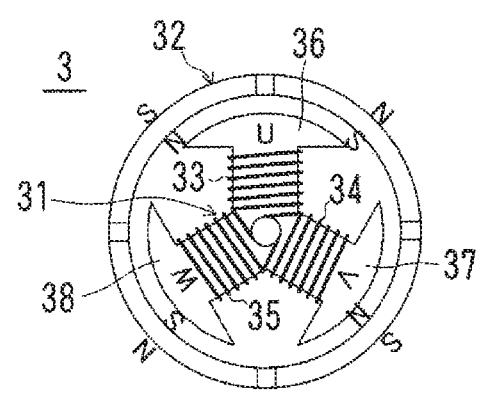
FIGS. 2A and 2B are diagrams schematically showing examples of the structure of brushless motors.
Figure 2B:
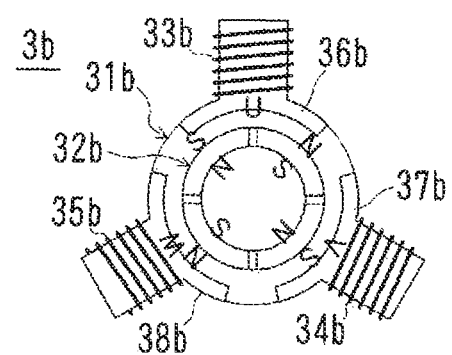

FIG. 1 shows an outline of the structure of an image forming apparatus 1 having a motor controller 21 according to an embodiment of the present invention. FIGS. 2A and 2B schematically show examples of the structure of brushless motors 3 and 3b.

Referring to FIG. 1, the image forming apparatus 1 is a color printer provided with an electrophotographic printer engine 1A. The printer engine 1A has four imaging stations 11, 12, 13, 14 to form a toner image of four colors of yellow (Y), magenta (M), cyan (C), and black (K). Each of the imaging stations 11, 12, 13, and 14 has a tubular photoconductor, an electrostatic charger, a developing unit, a cleaner, a light source for exposure, and so on.

The toner image of four colors is primarily transferred to the intermediate transfer belt 16, and then secondarily transferred onto paper 9 which has been sent out from a paper cassette 10 by a paper feed roller 15 and been conveyed. After the secondary transfer, the paper 9 passes through a fixing unit 17 and then to be delivered to a paper output tray 18 which is provided in an upper part of the image forming apparatus 1. While the paper 9 passes through the fixing unit 17, the toner image is fixed onto the paper 9 by application of heat and pressure.

The printer engine 1A uses a plurality of brushless motors including the brushless motor 3 as drive sources to drive the rotation of the fixing unit 17, the intermediate transfer belt 16, the paper feed roller 15, the photoconductor, and the developing unit. Stated differently, the printer engine 1A forms an image onto the paper 9 while using a rotating member of which rotation is driven by the brushless motors to feed the paper 9.

The brushless motor 3 is disposed, for example, in the vicinity of the fixing unit 17 to drive the rotation of a fixing roller 171. The brushless motor 3 is controlled by the motor controller 21.

Referring to FIGS. 2A and 2B, the brushless motors 3 and 3b are sensorless Permanent Magnet Synchronous Motors (PMSM).

The brushless motor 3 shown in FIG. 2A has a stator 31 for causing a rotating magnetic field and an outer rotor 32 using a permanent magnet. The stator 31 has a U-phase core 36, a V-phase core 37, and a W-phase core 38 that are located at 120° intervals from one another and three windings (coils) 33, 34, and 35 that are provided in the form of Y-connection. A 3-phase alternating current of U-phase, V-phase, and W-phase is applied to the windings 33-35 to excite the cores 36, 37, and 38 in turn, so that a rotating magnetic field is caused. The rotor 32 rotates in synchronism with the rotating magnetic field.

Instead of the brushless motor 3, the brushless motor 3b shown in FIG. 2B may be mounted on the image forming apparatus 1. The brushless motor 3b has a stator 31b for causing a rotating magnetic field and an inner rotor 32b using a permanent magnet. The stator 31b has a U-phase core 36b, a V-phase core 37b, and a W-phase core 38b that are located at 120° intervals from one another and three windings 33b, 34b, and 35b that are provided in the form of Y-connection. As with the brushless motor 3, the brushless motor 3b rotates in synchronism with the rotating magnetic field.

FIGS. 2A and 2B show examples in which the number of magnetic poles of each of the rotors 32 and 32b is four. However, the number of magnetic poles of each of the rotors 32 and 32b is not limited to four, may be two, or may be six or more. In any case, the motor controller 21 performs, on the brushless motors 3 and 3b, vector control (sensorless vector control) for estimating a position of magnetic poles and a rotational speed by using a control model based on a d-q axis coordinate system.

Figure 3:
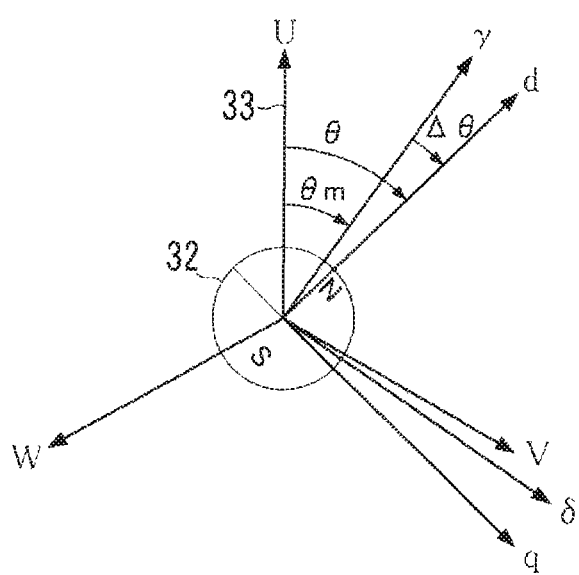
FIG. 3 is a diagram showing an example of a d-q axis model of a brushless motor.

FIG. 3 shows an example of a d-q axis model of the brushless motor 3. The vector control on the brushless motor 3 is simplified by an assumption that the 3-phase alternating current flowing through the windings 33-35 of the brushless motor 3 is a direct current applied to a 2-phase winding which rotates in synchronism with a permanent magnet acting as the rotor 32.

Let the direction of magnetic flux (direction of a north pole) of the permanent magnet be a d-axis. Let the direction of movement from the d-axis by an electrical angle of $\pi/2$[rad] (90°) be a q-axis. The d-axis and the q-axis are model axes. The U-phase winding 33 is used as a reference and a movement angle of the d-axis with respect to the reference is defined as an angle $\theta$. The angle $\theta$ represents an angular position (position) of a magnetic pole with respect to the U-phase winding 33. The d-q axis coordinate system is at a position moved, by angle $\theta$, from the reference, namely, the U-phase winding 33.

Since the brushless motor 3 is provided with no position sensor to detect an angle of the rotor 32, the motor controller 21 needs to estimate a position of the magnetic poles of the rotor 32. A $\gamma$-axis is defined corresponding to an estimated angle $\theta m$ which represents the estimated position of the magnetic pole. A $\delta$-axis is defined as a position moved, by an electrical angle of $\pi/2$, from the $\gamma$-axis. The $\gamma$-$\delta$ axis coordinate system is positioned moved, by estimated angle $\theta m$, from the reference, namely, the U-phase winding 33. A delay of the estimated angle $\theta m$ with respect to the angle $\theta$ is defined as an angle $\Delta\theta$.

Figure 4:
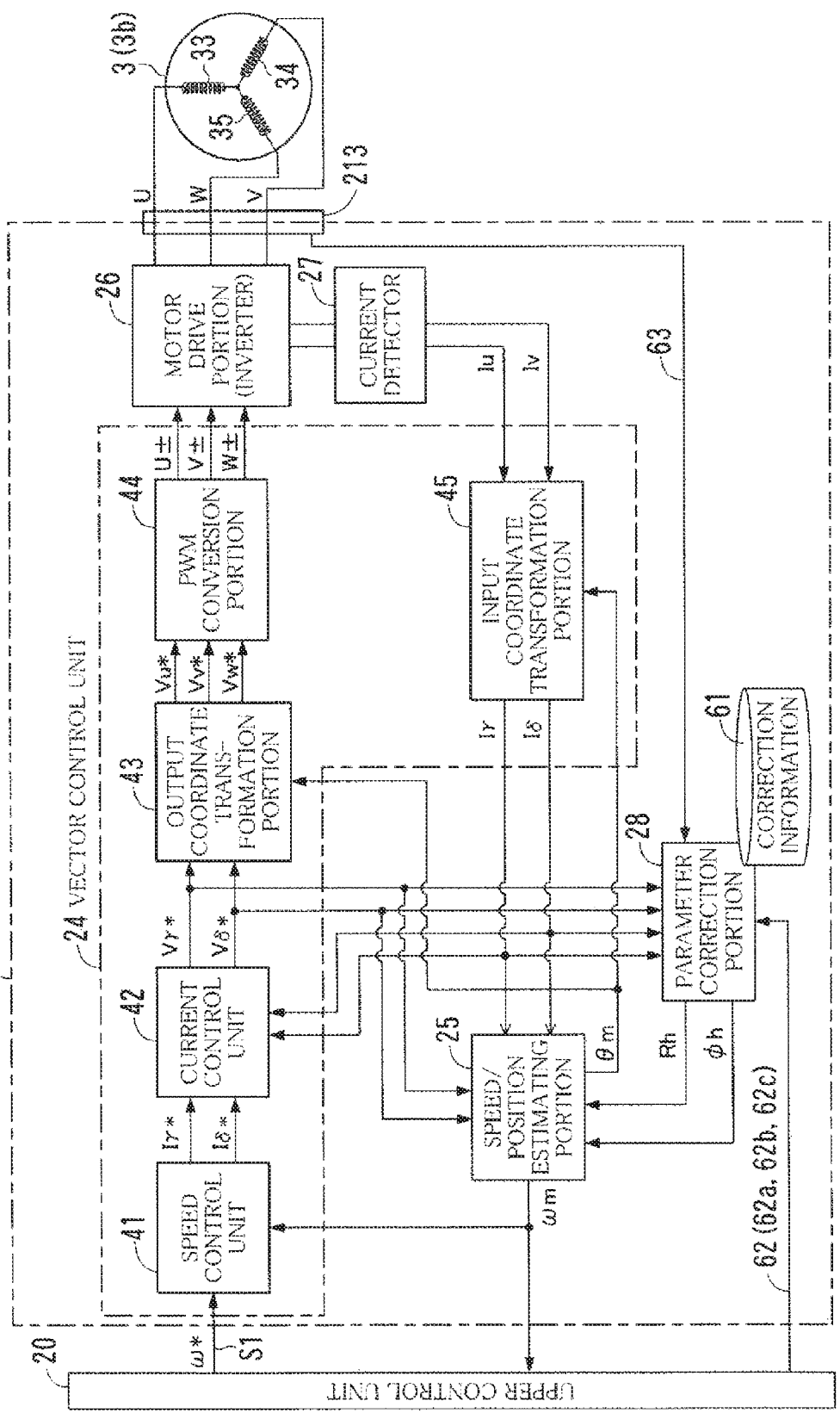
FIG. 4 is a diagram showing an example of the functional configuration of a motor controller.
Figure 5:
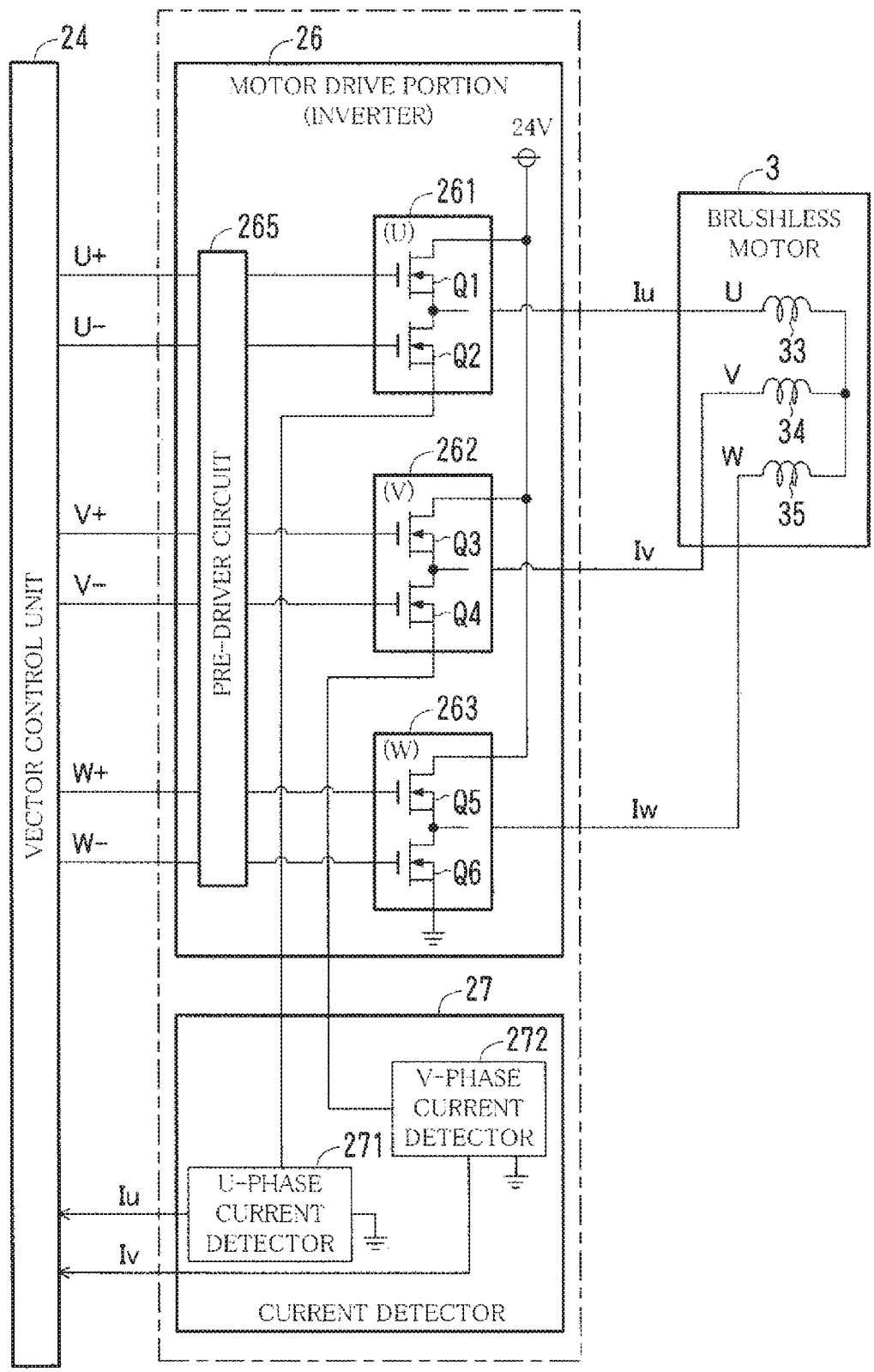
FIG. 5 is a diagram showing an example of the configuration of a motor drive portion and a current detector of a motor controller.

FIG. 4 shows an example of the functional configuration of the motor controller 21. FIG. 5 shows an example of the configuration of a motor drive portion and a current detector of the motor controller 21.

Referring to FIG. 4, the motor controller 21 includes a motor drive portion 26, a current detector 27, a vector control unit 24, a speed/position estimating portion 25, and a parameter correction portion 28.

The motor drive portion 26 is an inverter circuit for supplying a current to the windings 33-35 of the brushless motor 3 to drive the rotor 32. Referring to FIG. 5, the motor drive portion 26 includes three dual elements 261, 262, and 263, and a pre-driver circuit 265.

Each of the dual elements 261-263 is a circuit component that packages therein two transistors having common characteristics (Field Effect Transistor: FET, for example) connected in series.

The transistors Q1 and Q2 of the dual element 261 control a current Iu flowing through the winding 33. The transistors Q3 and Q4 of the dual element 262 control a current Iv flowing through the winding 34. The transistors Q5 and Q6 of the dual element 263 control a current Iw flowing through the winding 35.

Referring to FIG. 5, the pre-driver circuit 265 converts control signals U+, U−, V+, V−, W+, and W− fed from the vector control unit 24 to voltage levels suitable for the transistors Q1-Q6. The control signals U+, U−, V+, V−, W+, and W− that have been subjected to the conversion are given to control terminals (gates) of the transistors Q1-Q6.

The current detector 27 includes a U-phase current detector 271 and a V-phase current detector 272 to detect currents Iu and Iv flowing through the windings 33 and 34, respectively. Since the relationship of Iu+Iv+Iw=0 is satisfied, the current Iw can be obtained from the calculation of the values of the currents Iu and Iv detected.

The U-phase current detector 271 and the V-phase current detector 272 amplify a voltage drop by a shunt resistor having a small value (1/10Ω order) of resistance provided in the current path of the currents Iu and Iv to perform A/D conversion on the resultant, and output the resultant as detection values of the currents Iu and Iv. In short, a two-shunt detection is made.

The motor controller 21 may be configured by using a circuit component in which the motor drive portion 26 and the current detector 27 are integral with each other.

Referring back to FIG. 4, the vector control unit 24 controls the motor drive portion 26 in accordance with a speed command value ω* indicated in a speed command S1 given by a upper control unit 20. The upper control unit 20 is a controller to control an overall operation of the image forming apparatus 1. The upper control unit 20 gives the speed command S1 when: the image forming apparatus 1 warms up; the image forming apparatus 1 executes a print job; the image forming apparatus 1 turns into a power-saving mode; and so on. The speed command S1, given in a motor-off state under which the brushless motor 3 stops rotating or is about to stop, works as a command to start driving the rotation (start command).

The vector control unit 24 includes a speed control unit 41, a current control unit 42, an output coordinate transformation portion 43, a PWM conversion portion 44, and an input coordinate transformation portion 45.

The speed control unit 41 determines current command values Iγ* and Iδ* of the γ-δ axis coordinate system based on the speed command value ω* fed from the upper control unit 20 and an estimated speed value ωm fed from the speed/position estimating portion 25.

The current control unit 42 determines voltage command values Vγ* and Vδ* of the γ-δ axis coordinate system based on the current command values Iγ* and Iδ*.

The output coordinate transformation portion 43 transforms the voltage command values Vγ* and Vδ* to a U-phase voltage command value Vu*, a V-phase voltage command value Vv*, and a W-phase voltage command value Vw* based on the estimated angle θm fed from the speed/position estimating portion 25.

The PWM conversion portion 44 generates control signals U+, U−, V+, V−, W+, and W− based on the voltage command values Vu*, Vv*, and Vw* to output the control signals U+, U−, V+, V−, W+, and W− to the motor drive portion 26. The control signals U+, U−, V+, V−, W+, and W− are signals to control, by Pulse Width Modulation (PWM), the frequency and amplitude of the 3-phase alternating power to be supplied to the brushless motor 3.

The input coordinate transformation portion 45 uses the values of the U-phase current Iu and the V-phase current Iv detected by the current detector 27 to calculate a value of the W-phase current Iw. The input coordinate transformation portion 45 then calculates estimated current values Iγ and Iδ of the γ-δ axis coordinate system based on the estimated angle θm fed from the speed/position estimating portion 25 and the values of the 3-phase currents Iu, Iv, and Iw. In short, the input coordinate transformation portion 45 transforms the 3-phase currents to the 2-phase currents.

The speed/position estimating portion 25 determines the estimated speed value ωm and an estimated angle θm in accordance with a so-called voltage current equation based on the estimated current values Iγ and Iδ fed from the input coordinate transformation portion 45 and the voltage command values Vγ* and Vδ* fed from the current control unit 42. The estimated speed value ωm is an example of an estimated value of the rotational speed of the rotor 32. The estimated angle θm is an example of an estimated value of the position of magnetic poles of the rotor 32. The estimated current values Iγ and Iδ are examples of values of the currents Iu and Iv detected by the current detector 27.

The estimated speed value ωm thus determined is outputted to the speed control unit 41. The estimated speed value ωm is sent also to the upper control unit 20 as monitor information of the rotation state. The estimated angle θm thus determined is sent to the output coordinate transformation portion 43 and the input coordinate transformation portion 45.

The voltage current equation related to the processing by the speed/position estimating portion 25 has, as parameters, a resistance value R of the windings 33-35 and an inductance (L) of the windings 33-35. The inductance (L) is associated with an interlinkage magnetic flux φ caused by the permanent magnet across the windings 33-35. Stated differently, the interlinkage magnetic flux φ is one of parameters of an operation for estimating the rotational speed and the position of magnetic poles. The interlinkage magnetic flux φ is defined based on the material of the permanent magnet, the structure of the brushless motor 3, and so on.

The value of the interlinkage magnetic flux φ greatly varies with change in temperature. The resistance value R of the windings 33-35 also significantly depends on temperature. The temperature of the brushless motor 3 varies with heating of the windings 33-35 due to energization and with change in ambient temperature. Thus, for further accurate estimation of the rotational speed and the position of magnetic poles, it is necessary to correct parameter values for the operation for estimation in accordance with the change in temperature. For the correction, the parameter correction portion 28 is provided.

The parameter correction portion 28 corrects a parameter value φh indicating the interlinkage magnetic flux φ based on correction information 61 described later. The parameter correction portion 28 also corrects a parameter value Rh indicating the resistance value R of the windings 33-35. The parameter correction portion 28 then conveys the parameter values φh and Rh thus corrected to the speed/position estimating portion 25.

The speed/position estimating portion 25 uses the parameter values φh and Rh corrected by the parameter correction portion 28 to determine the estimated speed value ωm and the estimated angle θm.

The description goes on to the configuration and operation of the motor controller 21, focusing on the functions of the parameter correction portion 28.

Figure 6A:
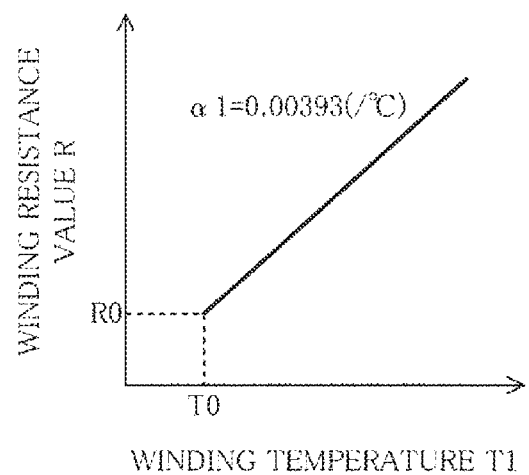
FIG. 6A is a diagram showing the dependence of winding resistance value on temperature.
Figure 6B:
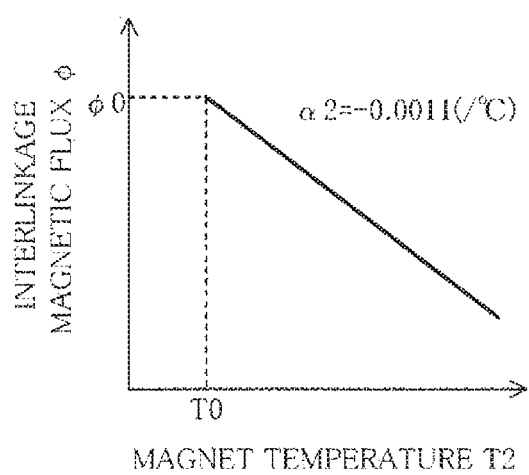
FIG. 6B is a diagram showing the dependence of an interlinkage magnetic flux on temperature.

FIGS. 6A and 6B show the dependence of the resistance value R of the windings 33-35 and the interlinkage magnetic flux φ on temperature.

As shown in FIG. 6A, the resistance value R of the windings 33-35 increases with the increase in a winding temperature T1. The winding temperature T1 is a temperature of the windings 33-35. The resistance value R is expressed in the following Equation (1).

$$R = R0[1 + \alpha1(T1 - T0)] \quad (1)$$

wherein R0 represents a resistance value with respect to a reference temperature, T0 represents the reference temperature, T1 represents the winding temperature, and α1 represents a temperature coefficient.

In Equation (1), the temperature coefficient α1 is specifically a mean value of values measured for temperatures of a temperature range under which the brushless motor 3 is supposed to be used, for example, the temperature range of 0-55° C. with the reference temperature T0 used as the minimum temperature of the temperature range. Where the material of the windings 33-35 is copper, the temperature coefficient α1 may be set at 0.00393[/° C.], for example.

As shown in FIG. 6B, the interlinkage magnetic flux φ decreases with increase in a magnet temperature T2. The magnet temperature T2 is a temperature of the permanent magnet acting as the rotor 32. The interlinkage magnetic flux φ is expressed in the following Equation (2).

$$\varphi = \varphi0[1 + \alpha2(T2 - T0)] \quad (2)$$

wherein φ0 represents an interlinkage magnetic flux with respect to a reference temperature, T0 represents the reference temperature, T2 represents the magnet temperature, and α2 represents a temperature coefficient.

In Equation (2), the temperature coefficient α2 may be specifically set at −0.0011[/° C.] for example for the case where the permanent magnet is a neodymium magnet.

Figure 7A:
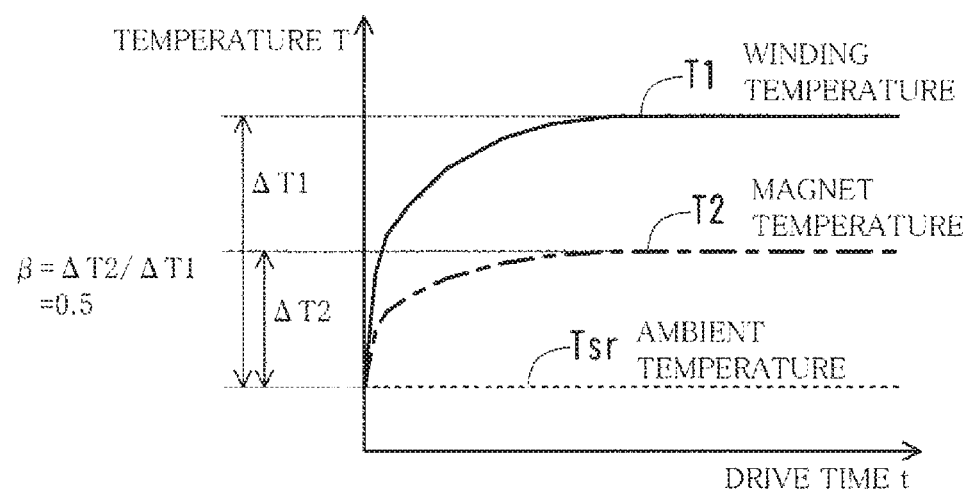
FIGS. 7A and 7B are diagrams showing examples of the relationship between winding temperature and magnet temperature.
Figure 7B:
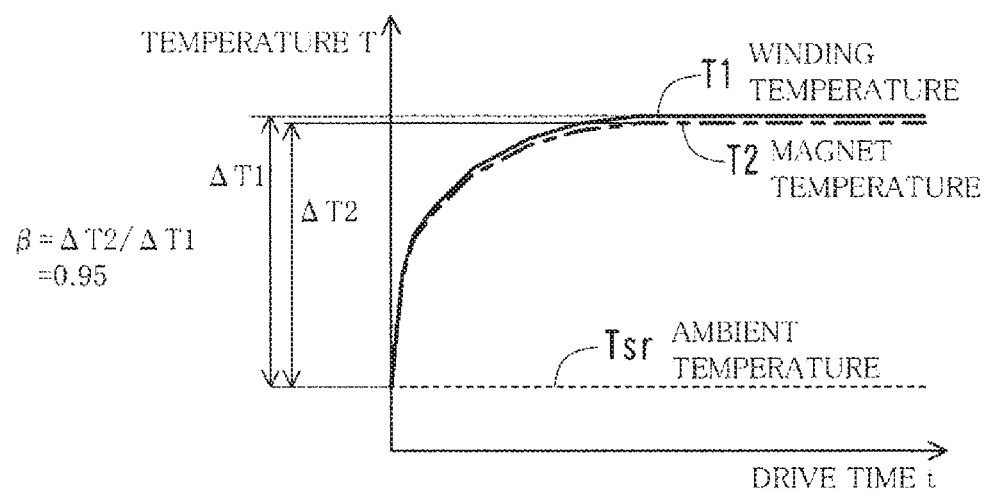

FIGS. 7A and 7E show examples of the relationship between the winding temperature T1 and the magnet temperature T2. FIG. 7A shows the result of an experiment that the brushless motor 3 is left stopped, the drive is started at a time when the entirety of the brushless motor 3 reaches an ambient temperature Tsr, and changes in the winding temperature T1 and the magnet temperature T2 are examined. FIG. 7B shows the result of a similar experiment conducted on the brushless motor 3b.

According to the experiments, the resistance value R of the windings 33-35 was measured based on the voltage command values Vγ* and Vδ* and the estimated current values Iγ and Iδ, and the winding temperature T1 was calculated based on Equation (1). As for the magnet temperature T2, the drive was stopped intermittently and the magnet temperature T2 was calculated based on a measurement value of an inverse voltage caused at the time of the stop.

Referring to FIG. 7A, when the drive is started, a difference is made between the winding temperature T1 and the magnet temperature T2. The magnet temperature T2 of the permanent magnet rotating outside the windings 33-35 is lower than the winding temperature T1 of the windings 33-35 heating by energization. In the example of FIG. 7A, the magnet temperature T2 increases only by a half or so of the increase in the winding temperature T1. To be specific, around a time when the increase in temperature is saturated sometime after the drive is started, a value of a ratio β of a temperature difference ΔT2 between the ambient temperature Tsr and the magnet temperature T2 to a temperature difference ΔT1 between the ambient temperature Tsr and the winding temperature T1 is 0.5. The value of the ratio β at any point in time before the increase in temperature is saturated is approximately 0.5.

On the other hand, in the case of the inner brushless motor 3b of FIG. 7B, the magnet temperature T2 rises largely with the winding temperature T1. The value of the ratio β is a value close to 1, for example, 0.95. In short, a relation is seen in which the ratio β of the winding temperature T1 to the magnet temperature T2 during the drive is, for example, 0.95.

The experiment was conducted on the brushless motors 3 and 3b with the ambient temperature Tsr changed. The result of the experiment showed that the ratio β in each of the brushless motors 3 and 3b was almost fixed. Stated differently, a relationship identified by the ratio β expressed in the following Equation (3) is established between the winding temperature T1 and the magnet temperature T2.

$$\beta = (T2 - Ts)/(T1 - Ts) \quad (3)$$

wherein Ts represents a set temperature set as an ambient temperature of the brushless motor. In view of this, the motor controller 21 takes account of the relationship between the winding temperature T1 and the magnet temperature T2 to correct the parameter value φh of the interlinkage magnetic flux φ and the parameter value Rh of the resistance value R of the windings 33-35.

In short, the correction information 61 used by the parameter correction portion 28 is information determined based on the winding temperature T1 and the ratio β representing the relationship between the winding temperature T1 and the magnet temperature T2. The correction information 61 is so stored as to be readable by the parameter correction portion 28 in advance.

Figure 8:
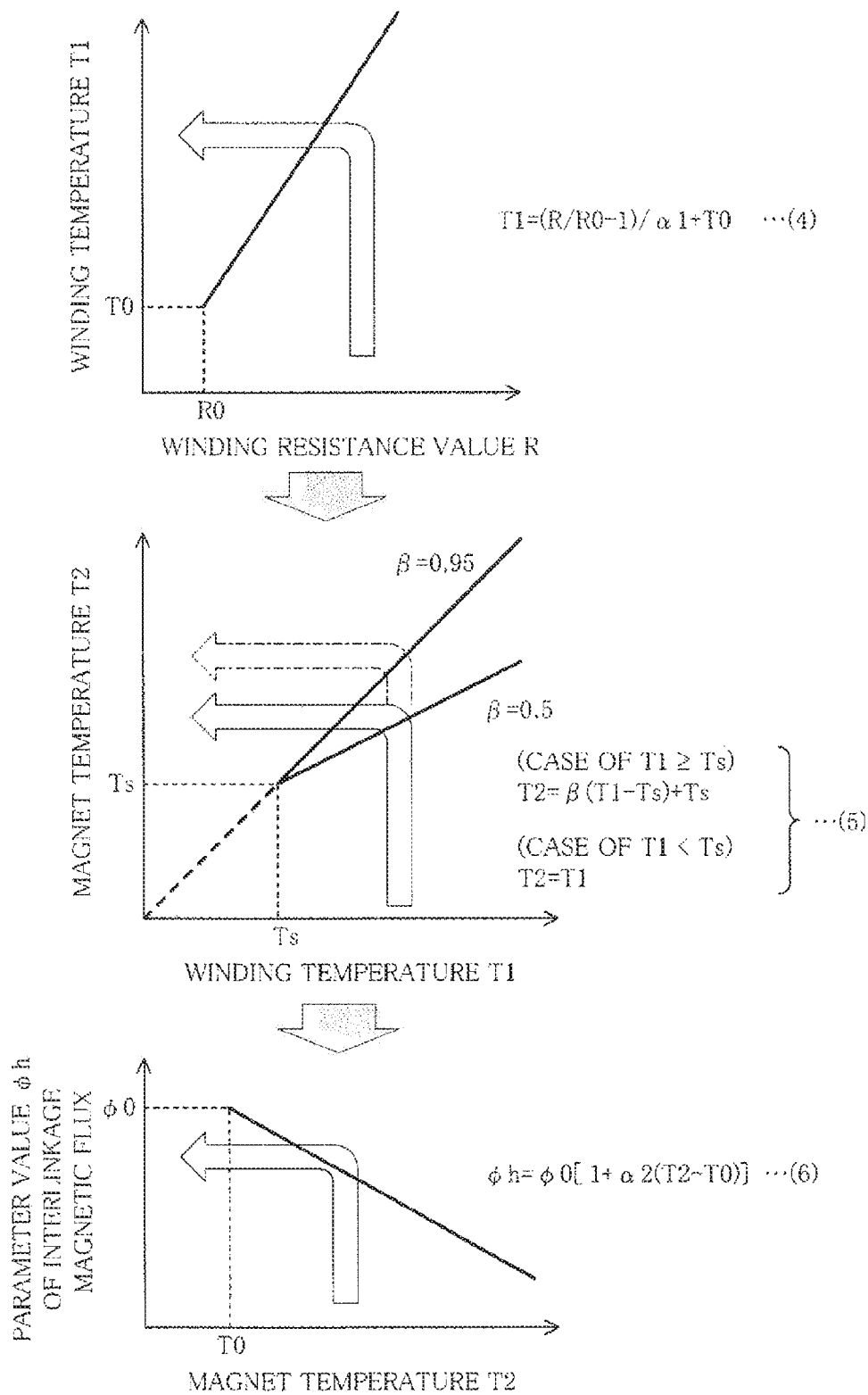
FIG. 8 is a diagram showing an example of the details of processing as to how to determine a parameter value of an interlinkage magnetic flux.
Figure 9:
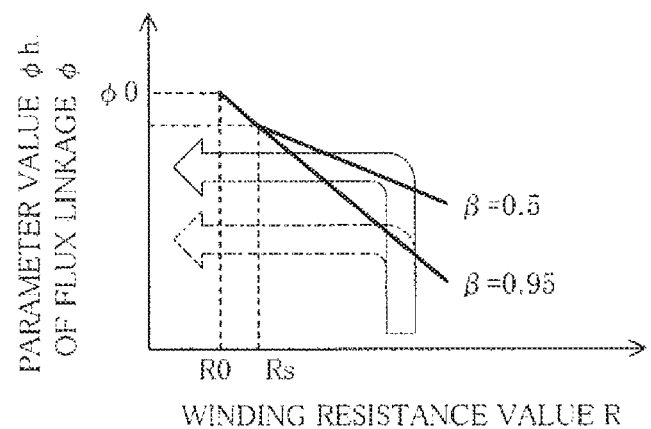
FIG. 9 is a diagram showing an example of operation for determining a parameter value of an interlinkage magnetic flux.

FIG. 8 shows an example of the details of processing as to how to determine the parameter value φh of the interlinkage magnetic flux φ. FIG. 9 shows an example of operation for determining a parameter value of the interlinkage magnetic flux φ.

As shown in the upper part of FIG. 8, Equation (4) is used to determine the winding temperature T1 based on the resistance value R of the windings 33-35. Equation (4) is an arithmetic expression obtained by modifying Equation (1).

$$T1 = (R/R0 - 1)/\alpha1 + T0 \quad (4)$$

Prior to the determination of the winding temperature T1, the resistance value R is determined. The resistance value R can be determined based on the values of the currents Iu and Iv detected by the current detector 27 and values of voltages corresponding to the currents (voltage command values Vγ* and Vδ*).

As shown in the middle part of FIG. 8, Equation (5) is used to determine the magnet temperature T2 based on the winding temperature T1 determined, the ratio β, and the set temperature Ts. In such a case, the value of the ratio β is a value corresponding to the control target of the motor controller 21. Where the brushless motor 3 is the control target, a value of "0.5" is used as the value of the ratio β. Where the brushless motor 3b is the control target, a value of "0.95" is used as the value of the ratio β.

Where the winding temperature T1 is lower than the set temperature Ts, it is supposed that the magnet temperature T2 is equal to the winding temperature T1. This prevents production of an inaccurate calculation result that the magnet temperature T2 is higher than the winding temperature T1 even when the set temperature Ts and the actual ambient temperature Tsr differ from each other.

$$T2=\beta(T1-Ts)+Ts \text{ (case of } T1 \geq Ts)$$

$$T2=T1 \text{ (case of } T1<Ts) \quad (5)$$

As shown in the lower part of FIG. 8, Equation (6) is used to determine a correction value of the parameter value φh of the interlinkage magnetic flux φ based on the magnet temperature T2 determined and the temperature coefficient α2 of the permanent magnet. The following Equation (6) is an arithmetic expression obtained by replacing φ of Equation (2) with φh.

$$\varphi h=\varphi 0[1+\alpha 2(T2-T0)] \quad (6)$$

As discussed above, the correction value of the parameter value φh may be determined by performing the operations expressed in Equations (4)-(6) in order. Alternatively, the correction value of the parameter value φh may be determined from the resistance value R as shown in FIG. 9 by performing the operation expressed in Equation (7) derived from Equations (4)-(6).

(Case of $R \geq R0[1+\alpha 1(Ts-T0)]$)

$$\varphi h=\varphi 0[1+\alpha 2\{\beta[(R/R0)-1)/\alpha 1+T0-Ts]+Ts-T0\}]$$

(Case of $R<R0[1+\alpha 1(Ts-T0)]$)

$$\varphi h=\varphi 0\{1+\alpha 2[(R/R0)-1)/\alpha 1 \quad (7)$$

The above-mentioned "R0[1+α1(Ts−T0)]" for branching in Equation (7) indicates the resistance value Rs of the windings 33-35 for the case where the winding temperature T1 is the set temperature Ts.

Instead of the operation expressed in Equation (7), a table may be prepared in which the resistance value R used as an input variant of Equation (7) is associated with the result of operation (namely, parameter value φh) and the parameter value φh can be determined by using a look-up table method.

In short, the correction information 61 used by the parameter correction portion 28 may be information indicating a correction value of the parameter value φh obtained by the calculation using the series of arithmetic expressions such as Equations (4)-(6), the single arithmetic expression such as Equation (7), or the arithmetic expression such as Equation (7).

Figure 10A:
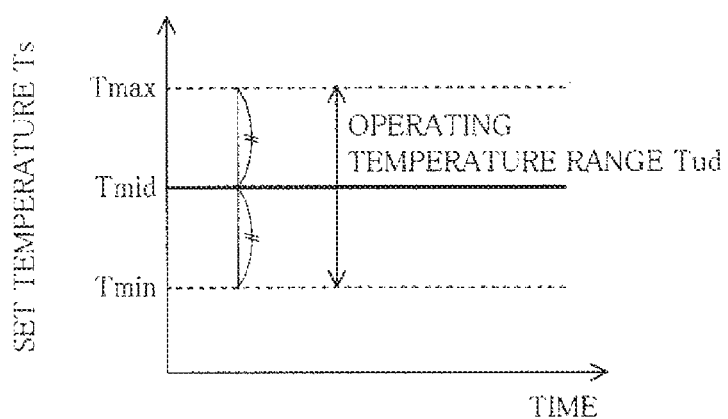
FIGS. 10A and 10B are diagrams showing examples as to how to define a set temperature.
Figure 10B:
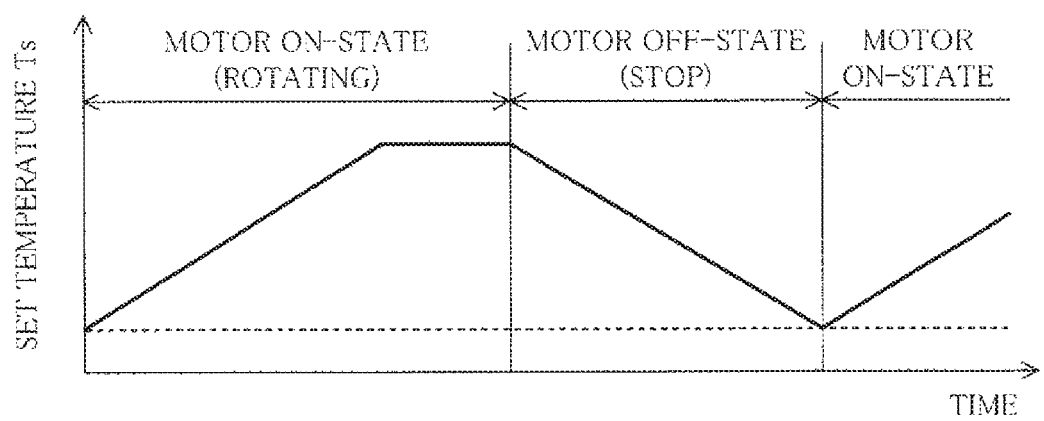

FIGS. 10A and 10B show examples as to how to define the set temperature Ts.

As shown in FIG. 10A, the control can be performed by setting the set temperature Ts at a constant temperature. For example, the set temperature Ts may be a middle temperature Tmid of an operating temperature range Tud within which the brushless motors 3 and 3b are supposed to be used. The middle temperature Tmid is 27.5° C. for the case where the minimum Tmin and the maximum Tmax of the operating temperature range Tud are 0° C. and 55° C., respectively.

The set temperature Ts is not limited to the middle temperature Tmid. The set temperature Ts may be selected to be a temperature lower than the middle temperature Tmid or a temperature higher than the middle temperature Tmid depending on which area the brushless motors 3 and 3b are used or under which environment the brushless motors 3 and 3b are used.

As shown in FIG. 10B, the set temperature Ts may be changed appropriately. Changing the set temperature Ts improves the accuracy of correction on the parameter value φh.

In the example of FIG. 10B, the set temperature Ts is changed in such a manner that the set temperature Ts is gradually increased up to a predetermined value in a motor ON-state under which the drive is performed and the set temperature Ts is reduced as a motor OFF-state under which the drive is stopped continues. In such a case, the parameter correction portion 28 obtains, as a notice 62, drive state information 62a showing the drive state of the brushless motor 3 from the upper control unit 20 (FIG. 4), and sets the set temperature Ts in accordance with the drive state indicated in the drive state information 62a thus obtained.

As a modification of the foregoing, the set temperature Ts may be changed, when the image forming apparatus 1 is largely influenced by a heat source such as the fixing roller 171 (FIG. 1), depending on the operational state of the image forming apparatus 1 related to the state of the heat source. For example, during speedy warm-up operation involving a great amount of heat generation of the heat source, the set temperature Ts is set at a high value. In such a case, the parameter correction portion 28 obtains drive state information 62b showing the operational state of the image forming apparatus 1 and sets the set temperature Ts in accordance with the operational state shown in the drive state information 62b thus obtained.

As another modification of the foregoing, the set temperature Ts may be set, when the image forming apparatus 1 is provided with a temperature sensor for detecting a temperature of the vicinity of the brushless motor 3, in accordance with the detected temperature. In such a case, the parameter correction portion 28 obtains temperature detection information 62c showing the ambient temperature Tsr of the brushless motor 3 and sets the ambient temperature Tsr shown in the temperature detection information 62c obtained or a temperature close to the ambient temperature Tsr at the set temperature Ts.

Referring back to FIG. 4 again, the brushless motor 3 is electrically connected to the motor drive portion 26 via a connector 213 provided in the motor controller 21. The connector 213 is configured to output a signal 63 indicating a type of a motor connected thereto.

The type of a motor means rough classification based on a value of the ratio β. For example, motors having the same model number as each other are classified as the same type. Motors having different values of the ratio β in the specifications are classified as different types. The brushless motor 3 and the brushless motor 3b are different in type from each other.

The parameter correction portion 28 is capable of determining whether or not a control target of the motor controller 21 is the brushless motor 3 or the brushless motor 3b based on the signal 63. Another arrangement is also possible in which the connector 213 sends the signal 63 to the upper control unit 20, the upper control unit 20 sends information showing a motor type to the parameter correction portion 28, and the determination is made based on the information.

FIG. 11 shows an example of the correction information 61.

Referring to FIG. 11, the correction information 61 is structured to have a plurality of tables 61a and 61b used to correct the parameter value φh of the interlinkage magnetic flux φ by using the look-up table method as discussed above. The tables 61a and 61b are examples of a plurality of pieces of correction information determined for each of the brushless motors 3 and 3b different in type.

In the tables 61a and 61b, values of the resistance value R are associated with values of the parameter value φh obtained by the calculation using Equation (7) for each option of the set temperature Ts. The use of Equation (7) allows the tables 61a and 61b to be supposed that the magnet temperature T2 is equal to the winding temperature T1 when the winding temperature T1 is smaller than the set temperature Ts of the operating temperature range Tud.

Where the type determined based on the signal 63 is "A", the parameter correction portion 28 corrects the parameter value φh based on the table 61a corresponding to the brushless motor 3. Where the type determined is "B", the parameter correction portion 28 corrects the parameter value φh based on the table 61b corresponding to the brushless motor 3b.

Figure 12:
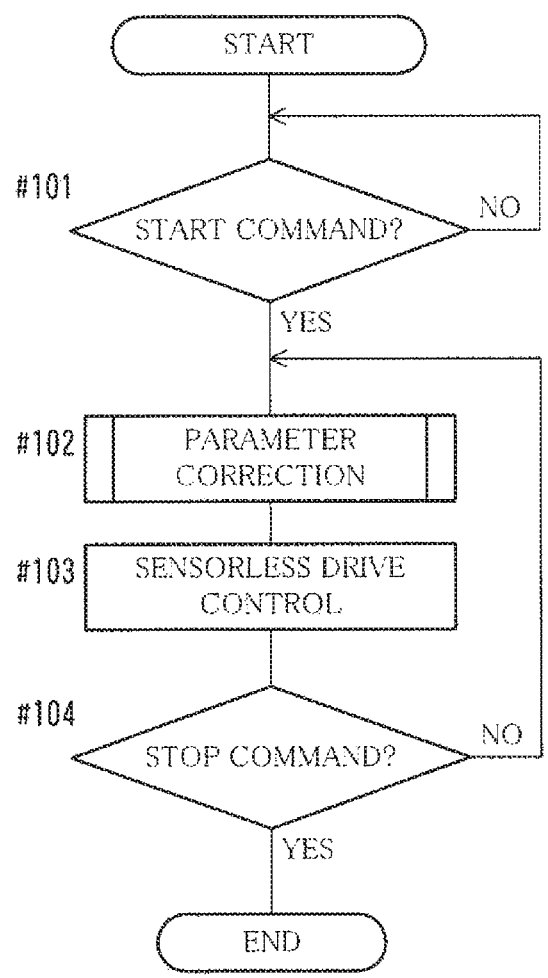
FIG. 12 is a diagram showing an example of the flow of processing in a motor controller.
Figure 13:
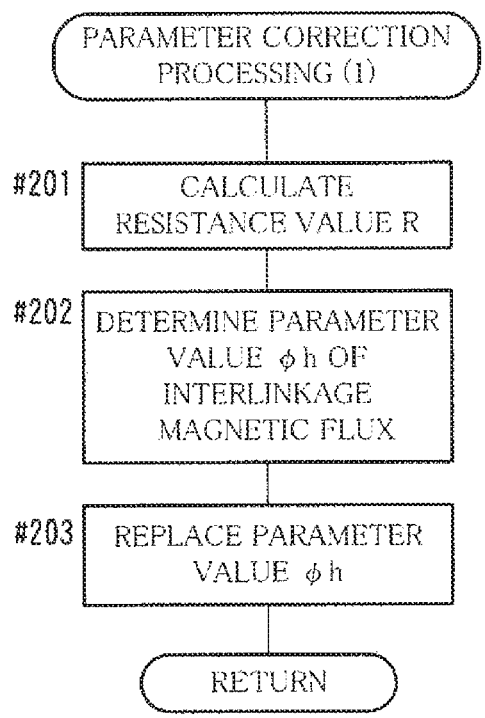
FIG. 13 is a diagram showing an example of the flow of parameter correction processing.
Figure 14:
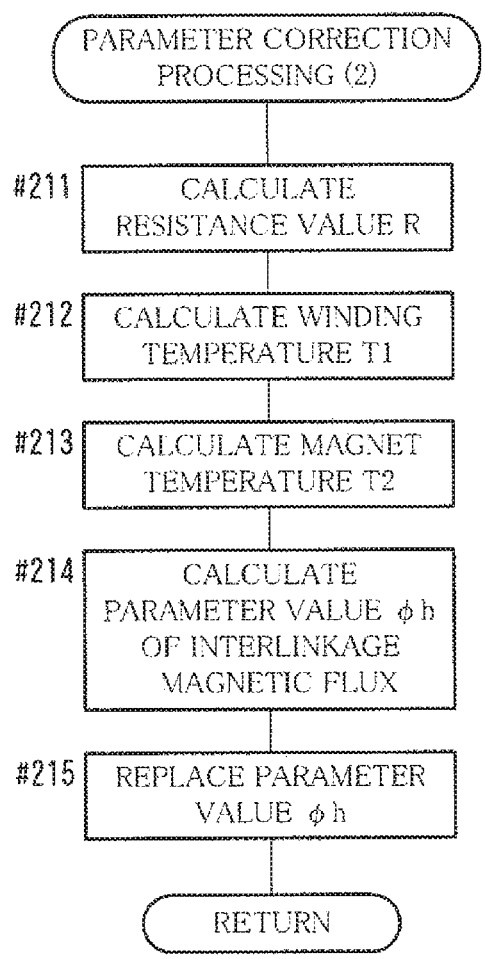
FIG. 14 is a diagram showing another example of the flow of parameter correction processing.

FIG. 12 shows an example of the flow of processing in the motor controller 21. FIG. 13 shows an example of the flow of parameter correction processing. FIG. 14 shows another example of the flow of parameter correction processing.

Referring to FIG. 12, the speed command S1 as the start command by the upper control unit 20 is waited (Step #101). When the speed command S1 is given to start controlling the brushless motor 3 (YES in Step #101), the motor controller 21 executes the parameter correction processing (Step #102).

After the parameter correction processing is performed to correct the parameter values φh and Rh, the sensorless drive control is started (Step #103). The sensorless drive control is control in which a rotational speed and a position of magnetic poles of the rotor 32 are estimated based on the corrected parameter values φh and Rh, a magnetic field based on the estimated rotational speed (ωm) and position of magnetic poles (θm) are generated as the rotating magnetic field, and the rotor 32 is rotated.

The parameter correction processing is executed at predetermined time intervals (one through a few seconds, for example) until the speed command S1 is given as a stop command with the speed command value ω* set at 0 (zero), in other words, while the rotor 32 is driven (NO in Step #104).

Referring to FIG. 13, according to the parameter correction processing, the resistance value R of the windings 33-35 is calculated based on the voltage command values Vγ* and Vδ* and the estimated current values Iγ and Iδ (Step #201). Then, the look-up table method is used to determine, as a correction value, the parameter value φh of the interlinkage magnetic flux φ corresponding to the resistance value R calculated (Step #202).

The parameter value φh set for the speed/position estimating portion 25 is replaced with the parameter value φh determined as the correction value (Step #203).

Alternatively, as shown in FIG. 14, according to the parameter correction processing, the resistance value R of the windings 33-35 is calculated (Step #211), and the winding temperature T1 is calculated by performing operation of Equation (4) (Step #212). Then, the magnet temperature T2 is calculated by performing operation of Equation (5) (Step #213), and the parameter value φh of the interlinkage magnetic flux φ is calculated by performing operation of Equation (6) (Step #214).

The parameter value φh set for the speed/position estimating portion 25 is replaced with the parameter value φh calculated (Step #215).

According to the foregoing embodiments, unlike a conventional control without distinction between the winding temperature T1 and the magnet temperature T2, the magnet temperature T2 is determined based on the winding temperature T1, and the parameter value φh of the interlinkage magnetic flux φ is corrected in accordance with the magnet temperature T2. This improves the accuracy of correction on the interlinkage magnetic flux φ to cope with change in temperature and to further reduce errors in estimation of the position of magnetic poles and of the rotational speed. The reduction in error enables the brushless motors 3 and 3b to operate more efficiently and prevents the loss of synchronization.

The temperature of the permanent magnet is determined without using a temperature sensor. This prevents the brushless motors 3 and 3b from having complex structures and also prevents the increase in costs of the brushless motors 3 and 3b.

In the foregoing embodiments, the value of the ratio β is not limited to the foregoing examples. The value of the ratio β depends on the material of each of the windings 33-35 and the permanent magnet, the structures of the stator 31 and the rotor 32, and the value of a gap between the stator 31 and the rotor 32.

The relationship between the winding temperature T1 and the magnet temperature T2 is approximated by the ratio β. The correction information 61 may be determined as the relationship represented in the form of quadratic function or more.

In the foregoing embodiments, the functions of the vector control unit 24, the speed/position estimating portion 25, and the parameter correction portion 28 can be implemented by, for example, a digital signal processor (DSP) and a program.

It is to be understood that the configuration of the image forming apparatus 1 and the motor controller 21, the constituent elements thereof, the temperature coefficient α, the value of α2, the content of the processing, the order of the processing, the time of the processing, and the like may be appropriately modified without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. A controller for a permanent magnet synchronous motor having a rotor using a permanent magnet, the rotor rotating by a rotating magnetic field caused by a current flowing through a winding, the controller comprising:

a drive portion configured to apply a current to the winding to drive the rotor;

a current detector configured to detect the current flowing through the winding;

an estimating portion configured to determine an estimated value of a rotational speed of the rotor and an estimated value of a position of magnetic poles of the rotor based on a value of the current detected by the current detector and a parameter value indicating an interlinkage magnetic flux caused by the permanent magnet across the winding;

a control unit configured to control the drive portion to cause the rotating magnetic field based on the estimated value of the rotational speed and the estimated value of the position of the magnetic poles; and a correction portion configured to correct the parameter value indicating the interlinkage magnetic flux based on correction information, the correction information being determined based on a temperature of the winding and a relationship between the temperature of the winding and a temperature of the permanent magnet; wherein the estimating portion uses the parameter value corrected by the correction portion to determine the estimated value of the rotational speed and the estimated value of the position of the magnetic poles.

2. The controller for the permanent magnet synchronous motor according to claim 1, wherein the correction information is information determined by using, as the relationship, a ratio of a temperature difference of the permanent magnet to a temperature difference of the winding before and after a temperature of the winding rises from any temperature of a temperature range within which the permanent magnet synchronous motor is supposed to be used.

3. The controller for the permanent magnet synchronous motor according to claim 2, wherein, when the temperature of the winding is smaller than a set temperature, the correction information is so determined that the temperature of the permanent magnet is equal to the temperature of the winding.

4. The controller for the permanent magnet synchronous motor according to claim 3, wherein, as the set temperature, a middle temperature of the temperature range is set.

5. The controller for the permanent magnet synchronous motor according to claim 3, wherein the correction portion obtains drive state information indicating a drive state of the permanent magnet synchronous motor, and sets the set temperature in accordance with the drive state indicated in the drive state information.

6. The controller for the permanent magnet synchronous motor according to claim 3, wherein the correction portion obtains temperature detection information indicating an ambient temperature of the permanent magnet synchronous motor, and sets the ambient temperature indicated in the temperature detection information to be the set temperature.

7. The controller for the permanent magnet synchronous motor according to claim 3, wherein the correction portion obtains operational state information indicating an operational state of the permanent magnet synchronous motor and of a device having a heat source causing increase in an ambient temperature of the permanent magnet synchronous motor, and sets the set temperature in accordance with the operational state indicated in the operational state information.

8. The controller for the permanent magnet synchronous motor according to claim 3, wherein
the correction information is information indicating an arithmetic expression or a corrected value of the parameter value calculated by using the arithmetic expression, and the arithmetic expression includes a series of: operation for determining a resistance value of the winding based on the value of the current detected and a value of a voltage corresponding to the current; operation for determining the temperature of the winding based on the resistance value; operation for determining the temperature of the permanent magnet based on the temperature of the winding, the ratio, and the set temperature; and operation for determining a corrected value of the parameter value based on the temperature of the permanent magnet and a temperature coefficient of the permanent magnet.

9. The controller for the permanent magnet synchronous motor according to claim 1, wherein the correction portion determines a type of the permanent magnet synchronous motor connected to the drive portion, and corrects the parameter value based on, among a plurality of pieces of correction information determined for a plurality of permanent magnet synchronous motors different in type, correction information determined for a permanent magnet synchronous motor of the determined type.

10. The controller for the permanent magnet synchronous motor according to claim 1, wherein, when a command to start controlling the permanent magnet synchronous motor is given, the control unit starts control operation for causing the rotating magnetic field after the correction portion corrects the parameter value.

11. The controller for the permanent magnet synchronous motor according to claim 1, wherein the correction portion corrects the parameter value while the drive portion drives the rotor.

12. An image forming apparatus comprising:
a permanent magnet synchronous motor having a rotor using a permanent magnet, the rotor rotating by a rotating magnetic field caused by a current flowing through a winding;

a controller configured to control the permanent magnet synchronous motor; and a printer unit configured to form an image onto paper while feeding the paper by using a rotating member of which rotation is driven by the permanent magnet synchronous motor; wherein the controller includes
a drive portion configured to apply a current to the winding to drive the rotor, a current detector configured to detect the current flowing through the winding, an estimating portion configured to determine an estimated value of a rotational speed of the rotor and an estimated value of a position of magnetic poles of the rotor based on a value of the current detected by the current detector and a parameter value indicating an interlinkage magnetic flux caused by the permanent magnet across the winding, a control unit configured to control the drive portion to cause the rotating magnetic field based on the estimated value of the rotational speed and the estimated value of the position of the magnetic poles, and a correction portion configured to correct the parameter value indicating the interlinkage magnetic flux based on correction information, the correction information being determined based on a temperature of the winding and a relationship between the temperature of the winding and a temperature of the permanent magnet, and the estimating portion uses the parameter value corrected by the correction portion to determine the estimated value of the rotational speed and the estimated value of the position of the magnetic poles.

13. A method for controlling a permanent magnet synchronous motor having a rotor using a permanent magnet, the rotor rotating by a rotating magnetic field caused by a current flowing through a winding, the method comprising:
   detecting the current flowing through the winding;
   correcting a parameter value indicating an interlinkage magnetic flux caused by the permanent magnet across the winding based on correction information, the correction information being determined based on a temperature of the winding and a relationship between the temperature of the winding and a temperature of the permanent magnet;
   estimating a rotational speed of the rotor and a position of magnetic poles of the rotor based on a value of the current detected and the parameter value corrected; and
   rotating the rotor by causing, as the rotating magnetic field, a magnetic field based on the rotational speed and the position of the magnetic poles.

14. The method according to claim 13, wherein a resistance value of the winding is determined based on the value of the current detected, and the temperature of the winding is estimated based on the resistance value determined.

* * * * *